Nov. 13, 1951  H. C. BUICKE  2,574,908
HOLDER FOR LEADER LINES
Filed Dec. 6, 1946
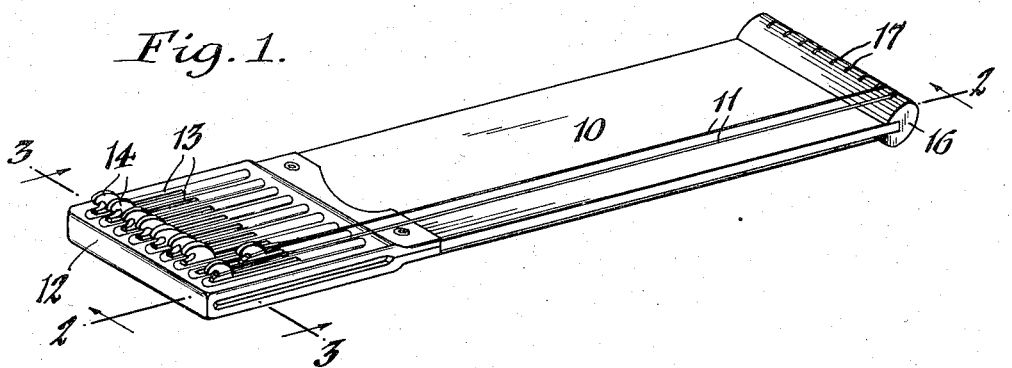
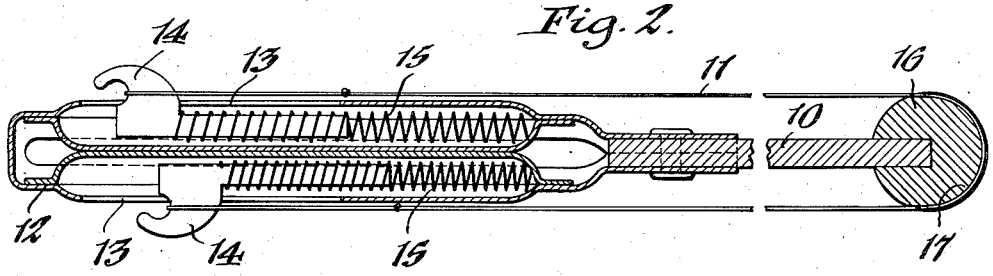
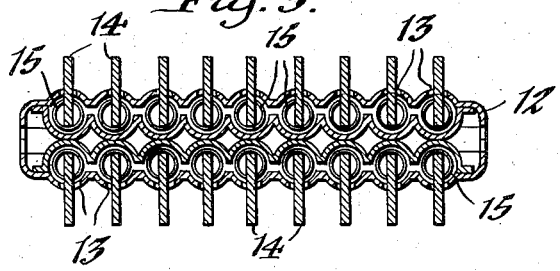  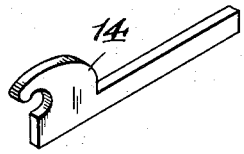
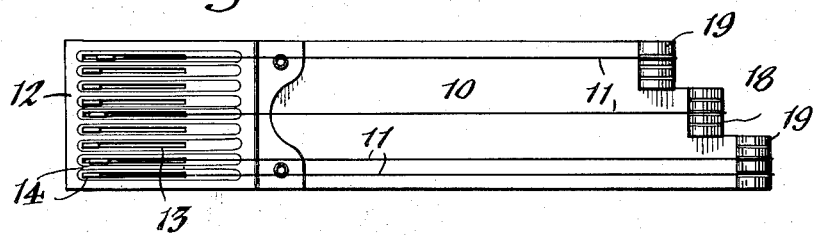
INVENTOR,
Harold C. Buicke,
By Walker P. Guyer
ATTORNEY.

Patented Nov. 13, 1951

2,574,908

UNITED STATES PATENT OFFICE 2,574,908

HOLDER FOR LEADER LINES

Harold C. Buicke, North Tonawanda, N. Y.

Application December 6, 1946, Serial No. 714,366

2 Claims. (Cl. 43—57.5)

This invention relates generally to improvements in fishing devices or appliances, but more particularly to a holder for the leader lines of fish hooks.

One object of the invention is to provide a holder of this character which is so designed that it will accommodate leader lines of various lengths and which is adapted to maintain the leaders under a high enough tension to hold them taut and straight.

A still further object is to provide simple and efficient means for facilitating the ready application and removal of the lines to and from the holder.

A still further object is to provide a holder which is simple, compact, neat and inexpensive in construction.

In the accompanying drawings:

Figure 1 is a perspective view of the leader line holder embodying my invention. Figure 2 is an enlarged longitudinal section taken on line 2—2, Figure 1. Figure 3 is an enlarged cross section taken on line 3—3, Figure 1. Figure 4 is a perspective view of one of the elements to which the loops of the leaders are connected. Figure 5 is a top plan view of a slightly modified form of the invention.

Similar characters of reference indicate the corresponding parts throughout the several views.

In the embodiment of the invention shown in Figures 1-4 inclusive, my holder consists of a body which is preferably in the form of a flat, rectangular-shaped member or panel 10 about which the leader lines 11 are detachably retained in individual loop-like fashion. At one end of this panel is a housing or guide section 12 having superimposed rows of guideways formed therein, and parallel rows of longitudinal slots 13 in its opposite or top and bottom sides communicating with said guideways in which hook-like elements 14 having a shank are guided. The looped ends of the leader lines are adapted to detachably engage these elements in the manner shown in Figure 2, and for the purpose of holding these lines taut on the holder each element 14 is biased towards one end of the housing by a spring 15 suitably confined within a guideway of the guide section 12 and abutting at one end against the latter and at its opposite end against such hook-like element to constantly project it outwardly and permit its yieldable displacement inwardly. In the drawings, two sets or groups of these hook-like elements 14 are shown in back to back relation.

At its opposite end the panel 10 is provided with a fixed guide or head member 16 which may be round, as shown, and secured thereto in any suitable manner. This guide is provided with a row of notches or grooves 17 disposed in longitudinally alined relationship with the hook-like elements 14 and around which the looped or intermediate portions of the leader lines are guided and retained against transverse displacement from the holder.

In applying the leader lines to this holder, they are connected at their looped ends to the companion hook-like elements 14 at the opposite sides of the holder while their intermediate portions are engaged with one or another of the head-notches 17. During the attachment of the leader lines in this manner the springs 15 permit the necessary yieldable displacement of the hook-like elements within certain limits, depending upon the lengths of the leaders, and the latter are not only held firmly and tautly in place under tension but they are effectually prevented from accidental displacement from the holder.

The modified form of the invention shown in Figure 5 is designed to accommodate leader lines of varying lengths and for this purpose its guide head end is stepped or staggered laterally as indicated generally at 18, and applied to each stepped portion is a notched guide head 19, each one of the latter being at a different distance from the hook bearing guide section 12. By this construction, the holder is divided into different length areas to readily receive the various sizes of leader lines which one may carry in his tackle box.

I claim as my invention:

1. A holder for leader lines, comprising a panel-like member provided at one end with a housing having rows of longitudinal slots in its top and bottom sides, hook-like elements including shanks guided in said housing slots with the hooks projecting from the opposite sides of said housing, said hook-like elements having springs connected thereto for urging them toward one end of the housing, and a head of substantially round cross section at the opposite end of said panel having guide means thereon in longitudinal alinement with said guide slots and with which the intermediate portions of the leader lines are adapted to engage, the looped ends of the leader lines being adapted to detachably engage said hook-like elements.

2. A holder for leader lines, comprising a panel-like member provided at one end with a housing defining superposed rows of opposing guideways having paralleling longitudinal slots therein exposed, through the top and bottom sides of the housing, individual resiliently displaceable hook-like elements including shanks guided in the housing-guideways with the hooks projecting through the slots thereof and to which hooks the opposite looped ends of the leader lines are adapted to be connected, the opposite end of said panel being stepped laterally and having groove heads thereon about one or another of which the intermediate portions of said leader lines are adapted to pass.

HAROLD C. BUICKE.

REFERENCES CITED

The following references are of record in the file of this patent:

UNITED STATES PATENTS

| Number | Name | Date |
|---|---|---|
| 445,514 | Schaum | Jan. 27, 1891 |
| 742,040 | Kurtz | Oct. 20, 1903 |
| 1,451,256 | Gardner | Apr. 10, 1923 |
| 1,465,619 | Alling | Aug. 21, 1923 |
| 1,489,471 | Tilton | Apr. 8, 1924 |
| 1,676,119 | Tipil | July 3, 1928 |
| 1,715,567 | Porter | June 4, 1929 |
| 2,041,232 | Collins | May 19, 1936 |
| 2,190,647 | Buicke | Feb. 20, 1940 |
| 2,431,821 | Murph | Dec. 2, 1947 |